United States Patent [19]

Annegarn

[11] Patent Number: 4,546,378
[45] Date of Patent: Oct. 8, 1985

[54] MOVEMENT DETECTION CIRCUIT FOR A PAL TELEVISION SIGNAL

[75] Inventor: Marcellinus J. J. C. Annegarn, Eindhoven, Netherlands

[73] Assignee: U.S. Philips Corporation, New York, N.Y.

[21] Appl. No.: 514,400

[22] Filed: Jul. 18, 1983

[30] Foreign Application Priority Data

Aug. 4, 1982 [NL] Netherlands .................. 8203095

[51] Int. Cl.⁴ .............................................. H04N 9/535
[52] U.S. Cl. ........................................ 358/31; 358/23; 358/24
[58] Field of Search ............................. 358/31, 23, 24

[56] References Cited

U.S. PATENT DOCUMENTS 4,498,099  2/1985  Pritchard .............................. 358/31

Primary Examiner—Richard Murray
Attorney, Agent, or Firm—Thomas A. Briody; William J. Streeter; Edward W. Goodman

[57] ABSTRACT

Movement detection in a PAL television signal is effected on that portion of the television signal which is located within the chrominance signal band. This portion (obtained via 3) is demodulated into color difference signals (11, 13) which are added (29) and subtracted (27). The subtracted signal is delayed for one picture period and combined (39) with the added signal. Then the absolute value is produced (45), so that a signal is obtained which only reports movement and does not interpret crosstalk from the luminance signal of a still picture to the chrominance signal as movement.

4 Claims, 2 Drawing Figures

MOVEMENT DETECTION CIRCUIT FOR A PAL TELEVISION SIGNAL

BACKGROUND OF THE INVENTION

The invention relates to a movement detection circuit for a PAL television signal containing a luminance signal and a chrominance signal having two quadrature components u(t) sin wt and ±v(t) cos wt, this movement detection circuit comprising a picture delay circuit.

U.S. Pat. No. 4,064,530 discloses a movement detection circuit of the above-described type wherein the input and output signals of a picture delay circuit are compared with each other after inversion of the chrominance signal in the delayed signal. It has been found that with such a movement detector it may happen that movement is detected in a still picture, due to crosstalk from the luminance signal to the chrominance signal.

SUMMARY OF THE INVENTION

The invention has for its object to provide a movement detection circuit for a PAL-television signal wherein the crosstalk from the luminance signal to the chrominance signal cannot produce a faulty indication that there is movement in a still picture.

According to the invention, a movement detection circuit of the type set forth in the opening paragraph, is characterized in that the movement detection circuit comprises a demodulation circuit for the chrominance signal, a combining circuit and a filter circuit to obtain a signal of the shape $(u(t)-u'(t))\pm(v(t)-v'(t))$, wherein u'(t) and v'(t) are demodulated chrominance signal components which are delayed relative to u(t) and v(t) by a time delay provided by the picture delay circuit, the demodulated single sideband components in this signal being suppressed and this signal being conveyed through an absolute value-producing circuit.

By effecting, in accordance with the invention, the movement detection on the demodulated chrominance signal, it has been found to be possible to prevent a faulty movement indication from occurring, because of the special properties of the PAL signal.

DESCRIPTION OF THE DRAWING

The invention will now be further described by way of example with reference to the accompanying drawing.

In the drawing

DESCRIPTION OF THE PREFERRED EMBODIMENTS

Figure 1:
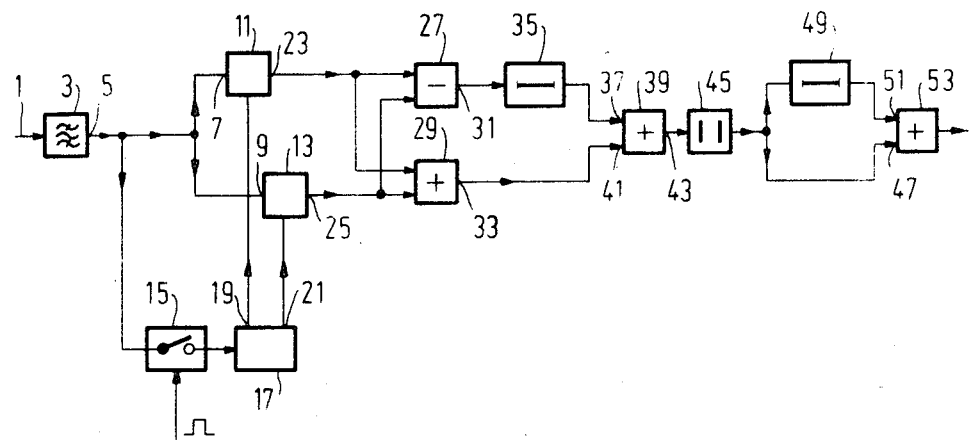
FIG. 1 illustrates, by means of a block diagram, a movement detection circuit in accordance with the invention.

In FIG. 1 there is applied to an input 1 a PAL television signal which can be written as the sum of a luminance signal y(t) and a chrominance signal comprising two quadrature components u(t) sin wt and ±v(t) cos wt, so $$y(t)+u(t)\sin wt \pm v(t)\cos wt \qquad (I)$$

In a band-pass filter 3 those components which are outside the frequency range in which the double sideband portion of the chrominance signal is located are removed from this television signal. As a result thereof the only remaining portion of the luminance signal is a high-frequency portion h(t). Therefore, a signal $$h(t)+u(t)\sin wt \pm v(t)\cos wt \qquad (II)$$

appears at an output 5 of the band-pass filter 3.

This signal is applied to an input 7 and to an input 9 of synchronous demodulators 11 and 13, respectively, and also to an oscillator circuit 17 via a switch 15. The switch 15 allows only the color synchronizing signal to pass to the oscillator circuit 17, which generates signal of the chrominance subcarrier frequency by means of this color synchronizing signal, and produces a signal sin wt, at an output 19 and a signal, cos wt, at an output 21.

These signals are applied to the synchronous demodulators 11 and 13, respectively, which together form a demodulation circuit.

The synchronous demodulator 11 supplies at an output 23 a signal of the shape $$h(t)\sin t + \tfrac{1}{2}u(t) \qquad (III)$$

wherein the polarity of the demodulated color difference signal u(t) remains equal from line to line, while the synchronous demodulator 13 produces at its output 25 a signal of the shape $$h(t)\cos wt \pm \tfrac{1}{2}v(t) \qquad (IV)$$

wherein the polarity of the demodulated color difference signal v(t) changes from line to line.

The signals at the outputs 23 and 25 of the synchronous demodulators 11 and 13 are applied to a substracting circuit 27 and to an adder circuit 29. A signal $$h(t)(\cos wt - \sin wt) - \tfrac{1}{2}u(t) \pm \tfrac{1}{2}v(t) \qquad (V)$$

is then formed at an output 31 of the subtracting circuit 27 and a signal $$h(t)(\cos wt + \sin wt) + \tfrac{1}{2}u(t) \pm v(t) \qquad (VI)$$

is formed at an output 33 of the adder circuit 29.

The signal at the output 31 of the circuit 27 is applied, via a delay circuit 35 producing a delay of one picture period, or two field periods, to an input 37 of a combining circuit 39, which acts as an adder circuit. The signal at the output 33 of the adder circuit 29 is applied to an input 41 of the combining circuit 39.

The signal at the input 37 of the combining circuit 39 has the shape $$h(t-\tau)(\cos w(t-\tau)-\sin w(t-\tau))-\tfrac{1}{2}u(t-\tau)\pm\tfrac{1}{2}v(t-\tau) \qquad (VII)$$

wherein $\tau = 40$ ms.

It holds for a PAL signal that $w=2\pi f$, wherein $f=283.7516\ f_h$, $f_h$ being the horizontal deflection frequency. That is to say, a line deflection period comprises 283.7516 chrominance subcarrier periods and consequently a picture period comprises $$625 \times 283.7516 = \frac{1145(625)+4}{4} = \frac{709375+4}{4} =$$

$$\frac{709380-1}{4} = (177345 - 1/4)$$

chrominance subcarrier periods.

From the above it follows that:

$$\cos w(t-\tau) = \cos(wt + \pi/2) = -\sin wt$$

$$\sin w(t-\tau) = \sin(wt + \pi/2) = \cos wt$$

In addition, the $v(t-\tau)$ signal has a polarity which is the opposite of the polarity of the signal $v(t)$, as the number of horizontal deflection periods per picture is odd.

Formula (VII) can therefore be written as $$h'(t)(-\sin wt = \cos wt) - \tfrac{1}{2}u'(t) \pm \tfrac{1}{2}v'(t) \quad (VIII)$$

wherein $$h'(t) = h(t-\tau)$$

$$u'(t) = u(t-\tau)$$

$$v'(t) = -v(t-\tau)$$

At an output 43 of the combining circuit 39 a signal of the following shape is produced $$(h(t) - h'(t))(\cos wt + \sin wt) + \tfrac{1}{2}(u(t) - u'(t)) \pm \tfrac{1}{2}(v(t) + -v'(t)) \quad (IX)$$

In this formula (IX) the terms $(h(t)-h'(t))$, $(u(t)-u'(t))$ and $(v(t)-v'(t))$ are all differential terms, that is to say a signal can only be produced at the output 43 of the combining circuit 39 when a difference occurs in one of these terms, so at the occurrence of movement. The cross-talk-induced portion $(h(t)-h'(t))$ $(\cos wt + \sin wt)$ of the luminance signal can only produce a movement indication when movement does indeed occur in the luminance signal.

The sign of the signal at the output 43 of the combining circuit 39 is removed by an absolutely-value producing circuit 45 and this signal is further applied to an input 47 and also, via a delay circuit 49 producing a delay equal to one horizontal deflection period, to an input 51 of an adder circuit 53. This prevents equal or opposite changes in the signals u and v from only producing a movement indication every other horizontal deflection period.

It will be obvious that the circuit 49, 53 may be omitted in the majority of cases.

If, in the substracting circuit 27 the signal $v(t)$ is substracted from $u(t)$, instead of $u(t)$ from $v(t)$ as described above, then the combining circuit 39 must be in the form of a subtracting circuit in which the signal at the input 37 must be subtracted from the signal at the input 41.

The band-pass filter 3 described above may also have for its object to suppress the single sideband components of the chrominance signal. If so desired, this suppression may however also be effected in the demodulated signals.

Figure 2:
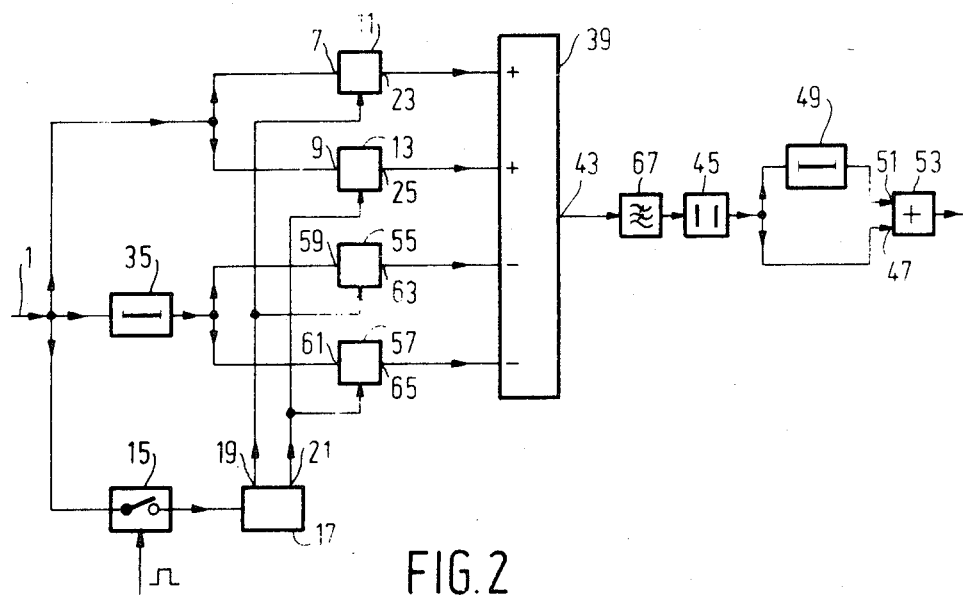
FIG. 2 also, illustrates, by means of a block diagram, a further possible movement detection circuit in accordance with the invention.

It will further be obvious that the sign of the output signals from the demodulators 11 and 13 can be changed by shifting the phase of the relevant signal at the output 19 or 21 of the oscillator circuit 17 through 180°. This change in sign must then be taken into account in the remaining portion of the circuit. Circuits of such a type are also assumed to be within the scope of the invention, and also circuits in which, for example, the delay circuit 35 is replaced by two delay circuits provided at the inputs of the subtracting circuit 27 or, for example, circuits in which more than two synchronous demodulators are used to produce signals of the desired polarities. FIG. 2 shows an embodiment of the last-mentioned implementation, the picture delay circuit being included in a portion of the circuit in which the signal has not yet been demodulated.

In FIG. 2 corresponding components are given the same reference numerals as in FIG. 1. For the description reference is made to the description given with reference to FIG. 1.

In FIG. 2 the demodulation circuit comprises in addition to the synchronous demodulators 11 and 13, two further synchronous demodulators 55 and 57, respectively, the respective inputs 59 and 61 of which are connected to an output of the picture delay circuit 35 which is connected to the input 1, and respective outputs 63 and 65 of which are each connected to an input of the combining circuit 39, two further inputs of which are connected to the outputs of the demodulators 11 and 13.

The synchronous demodulator 55 receives the signal $\sin wt$ from the output 19 and the synchronous demodulator 57 receives the signal $\cos wt$ from the output 21 of the oscillator circuit 17 as reference signals.

In a comparable manner as shown in FIG. 1, it can be demonstrated that the synchronous demodulators 11, 13, 55, 57 supply the following signals:

From the output 23 of the demodulator 11

$$\tfrac{1}{2}u(t) + h(t)\sin wt \quad (X)$$

From the output 25 of the demodulator 13

$$\pm \tfrac{1}{2}v(t) + h(t)\cos wt \quad (XI)$$

From the output 63 of the demodulator 55

$$\pm \tfrac{1}{2}v-(t) + h'(t)\sin wt \quad (XII)$$

From the output 65 of the demodulator 57

$$\tfrac{1}{2}u'(t) + h'(t)\cos wt \quad (XIII)$$

(X)+(XI)−(XII)−(XIII) now results in $$\tfrac{1}{2}(u(t) - u'(t)) \pm \tfrac{1}{2}(v(t) - v'(t)) + (h(t) - h'(t))(\sin wt = \cos wt)$$

So the combining circuit 39 must add together the signals at the outputs 23 and 25 of the demodulators 11 and 13 and must subtract therefrom the signals at the outputs 63 and 65 of the demodulators 55 and 57 to render it possible for this combining circuit to supply from its output 43 the same signal as in the example of FIG. 1.

The filter circuit is now provided by a low-pass filter 67 connected to the output 43 of the combining circuit 39, this low-pass filter 67 suppressing the demodulated single sideband components.

The absolute-value producing circuit 45 is connected to an output of this low-pass filter 67.

Also here it holds that the sign of the output signals of the demodulators 11, 13, 55 and 57 can be influenced by the choice of the polarity of the reference signal and that in the majority of cases, the circuit 49, 53 can be omitted.

It will further be obvious that also circuits by means of which signals of the shape (XI) are obtained in which the signs of the three terms are difference than described herein must be considered to be within the scope of the invention.

What is claimed is:

1. A movement detection circuit for a PAL television signal containing a luminance signal and a chrominance signal having two quadrature components u(t) sin wt and ±v(t) cos wt, this movement detection circuit comprising a picture delay circuit, characterized in that the movement detection circuit further comprises demodulation circuit means for the chrominance signal, a combining circuit (3) and a filter circuit (3) to obtain a signal of the shape (u(t)−u'(t))±(v(t)−v'(t)), wherein u'(t) and v'(t) are demodulated chrominance signal components which are delayed relative to u(t) and v(t) by a time delay provided by the picture delay circuit, the demodulated single sideband components in this signal being suppressed and this signal being conveyed through an absolute value-producing circuit.

2. A movement detection circuit as claimed in claim 1, characterized in that the filter circuit comprises a band-pass filter, for suppressing that portion of the television signal which does not contain chrominance signal components, coupled to an input of the demodulation circuit means which demodulates the chrominance signal into two color difference signals one of which changes its sign from horizontal deflection period to horizontal deflection period, and the movement detection circuit further comprises an added circuit and a subtracting circuit for adding and subtracting, respectively, the demodulated color difference signals, the picture delay circuit and the combining circuit for combining the signal from the subtracting circuit delayed by the picture delay circuit and the undelayed signal from the adder circuit, being coupled to the substracting circuit, while the absolute-value producing circuit is coupled to an output of the combining circuit.

3. A movement detection circuit as claimed in claim 2, characterized in that the movement detection circuit further comprises an adder circuit having an input coupled to an output of the absolute-value-producing circuit and a further input coupled to the output of the absolute-value producing circuit via a delay circuit producing a delay of one horizontal deflection period.

4. A movement detection circuit as claimed in claim 1, characterized in that the movement detection circuit further comprises an adder circuit having an input coupled to an output of the absolute-value-producing circuit and a further input coupled to the output of the absolute-value producing circuit via a delay circuit producing a delay of one horizontal deflection period.

* * * * *